US012676484B2

(12) United States Patent
Deng et al.

(10) Patent No.: US 12,676,484 B2
(45) Date of Patent: Jul. 7, 2026

(54) ELECTRIC ENERGY REGULATION METHOD, APPARATUS, DEVICE, AND STORAGE MEDIUM

(71) Applicant: SHENZHEN HELLO TECH ENERGY CO., LTD, Shenzhen (CN)

(72) Inventors: Zhixian Deng, Shenzhen (CN); Zhongwei Sun, Shenzhen (CN); Wenjun Huang, Shenzhen (CN)

(73) Assignee: SHENZHEN HELLO TECH ENERGY CO., LTD, Shenzhen (CN)

( * ) Notice: Subject to any disclaimer, the term of this patent is extended or adjusted under 35 U.S.C. 154(b) by 0 days.

(21) Appl. No.: 19/238,570

(22) Filed: Jun. 16, 2025

(65) Prior Publication Data

US 2025/0309653 A1 Oct. 2, 2025

Related U.S. Application Data

(63) Continuation of application No. PCT/CN2024/085285, filed on Apr. 1, 2024.

(30) Foreign Application Priority Data

Aug. 10, 2023 (CN) .......................... 202311010122.4

(51) Int. Cl.
*H02J 3/32* (2026.01)
*H02J 3/00* (2026.01)
(Continued)

(52) U.S. Cl.
CPC ............ *H02J 3/32* (2013.01); *H02J 3/00125* (2020.01); *H02J 3/12* (2013.01); *H02J 3/381* (2013.01);
(Continued)

(58) Field of Classification Search
CPC .. H02J 3/32; H02J 3/00125; H02J 3/12; H02J 3/381; H02J 2101/24; H02J 2103/35;
(Continued)

(56) References Cited

U.S. PATENT DOCUMENTS 6,472,880 B1 10/2002 Kang
2005/0184594 A1* 8/2005 Fredette .................... H02J 3/32
307/78

(Continued)

FOREIGN PATENT DOCUMENTS

CN 104538999 A 4/2015
CN 110350560 A 10/2019
(Continued)

OTHER PUBLICATIONS

Energy Management System and Grid-Connected Energy Storage System Including The Energy Management System (Year: 2011 ).*
(Continued)

*Primary Examiner* — Rexford N Barnie
*Assistant Examiner* — Terrence R Willoughby

(57) ABSTRACT

An electric energy regulation method includes: selectively obtaining interface power information corresponding to each of a photovoltaic module interface, a load module interface, and a power grid module interface based on a current operating mode of an electric energy management system; determining a target dispatch power; and determining a to-be-supplemented electric power or a surplus electric power based on the target dispatch power, and invoking an energy storage module interface to supply energy based on the to-be-supplemented electric power or absorb energy based on the surplus electric power.

18 Claims, 7 Drawing Sheets

(51) Int. Cl.

| | |
|---|---|
| *H02J 3/001* | (2026.01) |
| *H02J 3/12* | (2026.01) |
| *H02J 3/38* | (2026.01) |
| *H02J 101/24* | (2026.01) |
| *H02J 103/35* | (2026.01) |
| *H02J 105/52* | (2026.01) |
| *H02J 105/53* | (2026.01) |

(52) U.S. Cl.
CPC ....... *H02J 2101/24* (2026.01); *H02J 2103/35* (2026.01); *H02J 2105/52* (2026.01); *H02J 2105/53* (2026.01)

(58) Field of Classification Search
CPC ...... H02J 2105/52; H02J 2105/53; H02J 3/38; H02J 7/35; Y02E 10/56
See application file for complete search history.

(56) References Cited

U.S. PATENT DOCUMENTS

| | | | | |
|---|---|---|---|---|
| 2011/0115295 A1* | 5/2011 | Moon | ....................... | H02J 3/32 |
| | | | | 307/65 |
| 2017/0033561 A1* | 2/2017 | Lim | ..................... | H02J 7/0068 |

FOREIGN PATENT DOCUMENTS

| | | | | |
|---|---|---|---|---|
| CN | 110932327 A | 3/2020 | | |
| CN | 115173452 A | 10/2022 | | |
| CN | 115173566 A | 10/2022 | | |
| CN | 116316750 A | 6/2023 | | |
| CN | 117134388 A | 11/2023 | | |
| EP | 2325970 A2 * | 5/2011 | ............... | H02J 3/32 |
| JP | 2013172514 A | 9/2013 | | |
| JP | 2022110903 A | 7/2022 | | |

OTHER PUBLICATIONS

International Search Report dated Jun. 15, 2024 in International Application No. PCT/CN2024/085285. English translation attached.
First Office Action from corresponding Chinese Application No. 202311010122.4, dated Dec. 17, 2024. English translation attached.
The Grant Notice from corresponding Chinese Application No. 202311010122.4, dated Mar. 26, 2025. English translation attached.
Notice of Reasons for Refusal dated Nov. 18, 2025 received in corresponding patent family application No. JP2025537097. English translation attached.

* cited by examiner

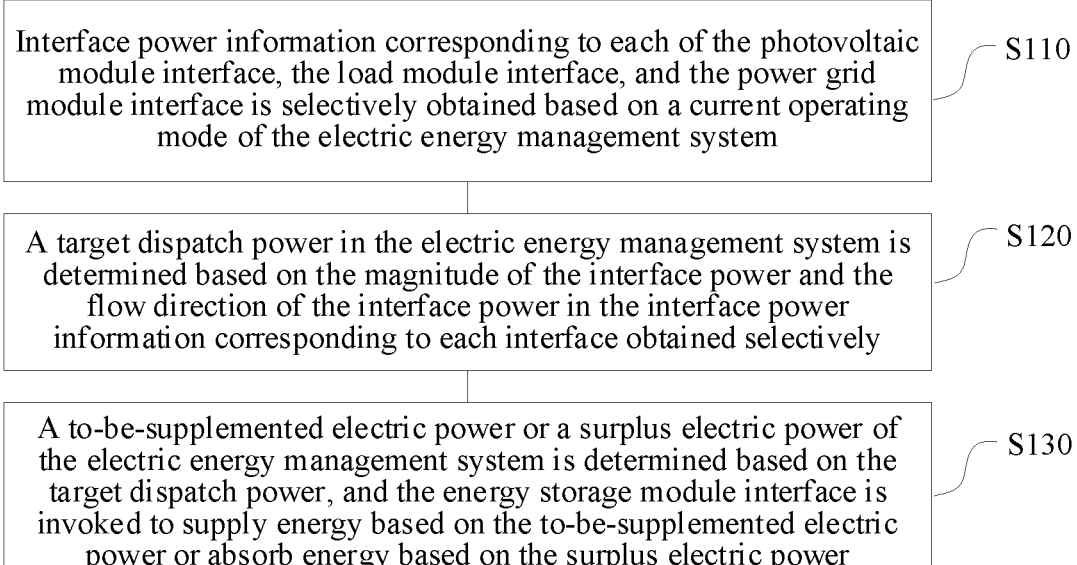

| | |
|---|---|
| Interface power information corresponding to each of the photovoltaic module interface, the load module interface, and the power grid module interface is selectively obtained based on a current operating mode of the electric energy management system | S110 |
| A target dispatch power in the electric energy management system is determined based on the magnitude of the interface power and the flow direction of the interface power in the interface power information corresponding to each interface obtained selectively | S120 |
| A to-be-supplemented electric power or a surplus electric power of the electric energy management system is determined based on the target dispatch power, and the energy storage module interface is invoked to supply energy based on the to-be-supplemented electric power or absorb energy based on the surplus electric power | S130 |

FIG. 4

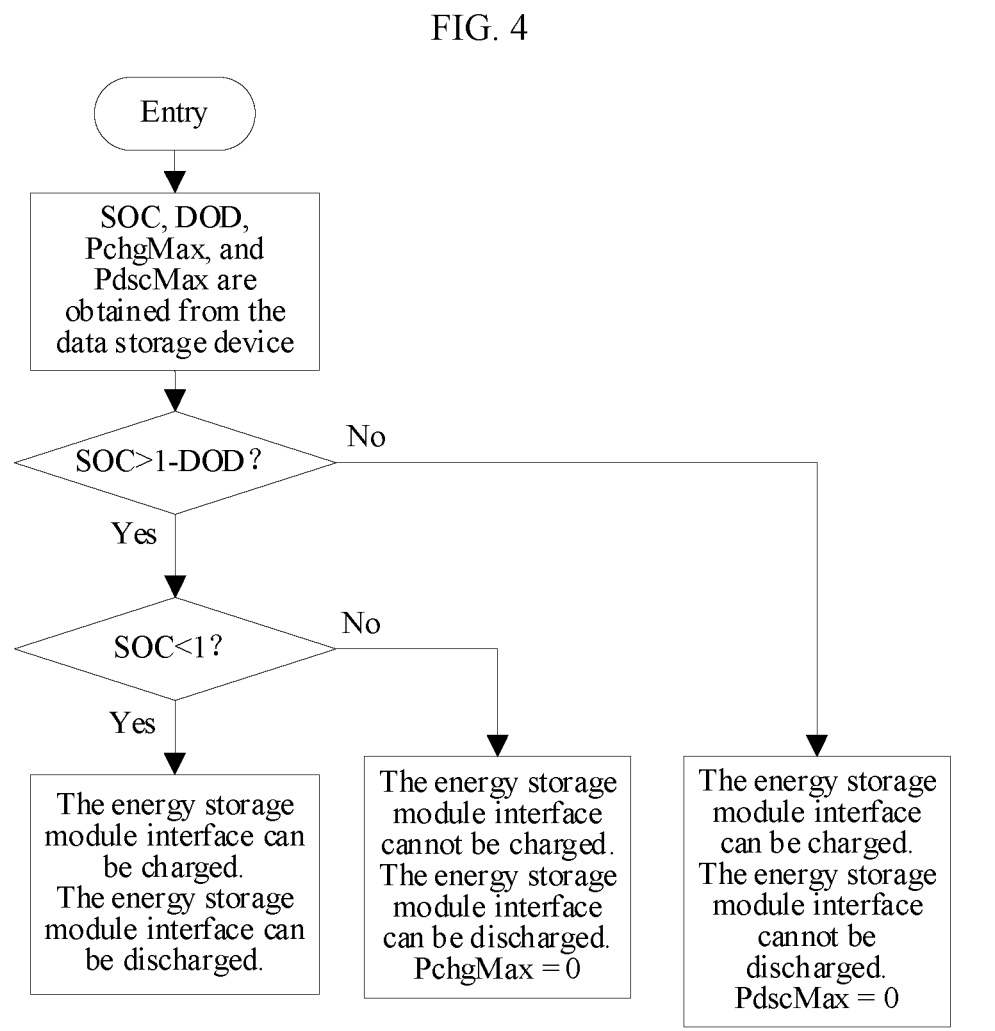

FIG. 5

Overload state | Power grid energy supplementation state | Battery energy absorption state under photovoltaic limitation PchgMax-PginMax          PchgMax

300

Interface power information obtaining module 310

Target dispatch power determination module 320

Regulation module 330

ELECTRIC ENERGY REGULATION METHOD, APPARATUS, DEVICE, AND STORAGE MEDIUM

CROSS-REFERENCE TO RELATED APPLICATION

This application is a continuation of International Application No. PCT/CN2024/085285, filed on Apr. 1, 2024, which claims priority to and benefits of Chinese patent application No. 202311010122.4, filed with China National Intellectual Property Administration on Aug. 10, 2023, the entire contents of which are incorporated herein by reference.

FIELD

The present disclosure relates to the field of household energy storage technologies, and more particularly, to an electric energy regulation method, an apparatus, an electronic device, and a storage medium.

BACKGROUND

The global energy crisis is becoming increasingly severe, which encourages promoting the development of the household energy storage market. After battery costs decline, the economic viability of household energy storage devices has become more prominent, and residents have shown a stronger tendency to mount energy storage systems. An energy management system in the energy storage system, as a core of an entire household energy storage device, controls a direction and a magnitude of energy flow of the device under different operating conditions, reasonably scheduling local energy to ensure the availability and economic viability of the household energy storage device. However, in the conventional energy management system, the inventors realized that integrating operating states of each device connected to the energy management system with energy flow management to form an integrated control logic results in extremely high complexity for this control logic as the number of devices connected to the energy management system and energy regulation modes increase, hindering maintainability and management efficiency.

SUMMARY

In view of the above problems, the present disclosure provides an electric energy regulation method, an apparatus, an electronic device, and a storage medium.

Embodiments of the present disclosure provide an electric energy regulation method. The electric energy regulation method is applied in an electric energy management system configured to manage electric power among a photovoltaic module interface, an energy storage module interface, a load module interface, and a power grid module interface. The method includes: selectively obtaining interface power information corresponding to each of the photovoltaic module interface, the load module interface, and the power grid module interface based on a current operating mode of the electric energy management system, the interface power information including a magnitude of interface power and a flow direction of the interface power; determining a target dispatch power in the electric energy management system based on the magnitude of the interface power and the flow direction of the interface power in the interface power information corresponding to each interface obtained selectively, the target dispatch power being a power that the electric energy management system requires the energy storage module interface to supply or absorb energy; and determining a to-be-supplemented electric power or a surplus electric power of the electric energy management system based on the target dispatch power, and invoking the energy storage module interface to supply energy based on the to-be-supplemented electric power or absorb energy based on the surplus electric power.

The embodiments of the present disclosure provide an electronic device. The electronic device includes: one or more processors; a memory; and one or more application programs stored in the memory and configured to be executed by the one or more processors. The one or more programs are configured to implement the electric energy regulation method provided in the first aspect.

The embodiments of the present disclosure provide a computer-readable storage medium having a program code stored thereon. The program code is capable of being called by a processor to implement an electric energy regulation method provided in the first aspect.

With the solution provided in the present disclosure, the interface power information corresponding to a plurality of module interfaces in the electric energy management system is determined based on different operating modes, the target dispatch power in the electric energy management system is determined based on the interface power information, and whether to obtain to-be-supplemented electric energy from the energy storage module interface or to transmit surplus electric energy to the energy storage module interface is determined based on the target dispatch power. By determining the control logic of the electric energy management system based on different operating modes, adverse effects caused by the integrated control logic are avoided. Moreover, the operating modes and the control logic of the module interfaces are independent of each other. As the operating modes or the module interfaces increase, the existing control logic is not affected, improving scalability of the electric energy management system.

BRIEF DESCRIPTION OF THE DRAWINGS

To clearly explain technical solutions of embodiments of the present disclosure, drawings used in the description of the embodiments are briefly described below. Obviously, the drawings as described below show merely some embodiments of the present disclosure. Based on these drawings, other drawings can be obtained by those skilled in the art without paying creative efforts.

FIG. 4 is a schematic flowchart illustrating an electric energy regulation method according to an embodiment of the present disclosure.

FIG. 5 is a flowchart illustrating a battery charging and discharging power setting of an energy storage module interface of an energy storage system according to an embodiment of the present disclosure.

DETAILED DESCRIPTION OF THE EMBODIMENTS

To enable those skilled in the art to better understand the technical solutions of the present disclosure, description will be made clearly and completely on the technical solutions in the embodiments of the present disclosure with accompanying drawings.

Figure 1:
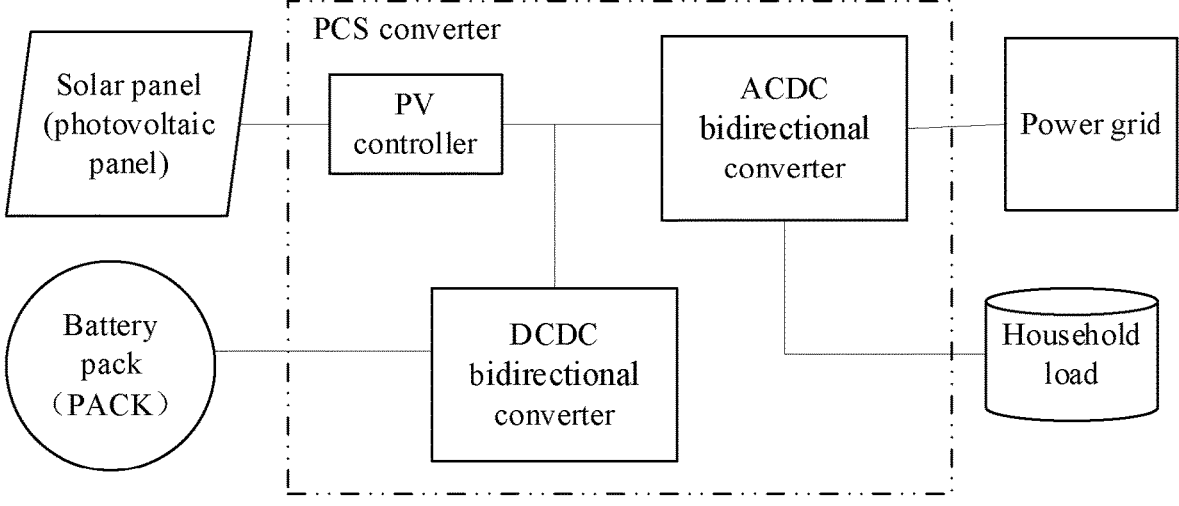
FIG. 1 is a block diagram showing devices in an energy storage system.

As illustrated in FIG. 1, FIG. 1 illustrates a block diagram showing devices in an energy storage system. The energy storage system mainly includes a battery pack with a battery management system (BMS) function, a storage-type bidirectional inverter unit (Power Conversion System, PCS), a photovoltaic panel (a solar panel), a monitoring front-end, and a monitoring back-end. The PCS includes a PV controller (solar charge controller), an alternating current-direct current bidirectional converter (ACDC bidirectional converter), and a direct current-direct current bidirectional converter (DCDC bidirectional converter). The PV controller is configured to transmit energy from the photovoltaic panel to the PCS, the ACDC bidirectional converter is configured to complete the energy exchange between the PCS and a power grid, and the DCDC bidirectional converter is configured to exchange energy between the PCS and the battery pack. As an energy source, the photovoltaic panel continuously releases energy to the system, the energy intensity of the photovoltaic panel is affected by the light intensity, it cannot be ensured that the energy remains stable at all times. A household load may be a refrigerator, a washing machine, and other household appliances mounted on AC lines when using the household energy storage system, and its energy mainly comes from the battery pack, the solar panel, or the power grid. As a stable energy supply for the system, the battery pack may release and absorb energy, and is a center of energy regulation. Regulating energy output of the battery pack is used to ensure stability of the system. The power grid is a backup energy source of an entire system. When energy of the system is insufficient, the system can absorb energy from the power grid to ensure the stability of the energy storage system. The monitoring front-end is mainly configured to monitor and display the energy flow and energy exchange in the energy storage system. The monitoring back-end is mainly configured to monitor energy data in the energy storage system. Functions of the monitoring front-end and the monitoring back-end are not specifically limited here.

Figure 2:
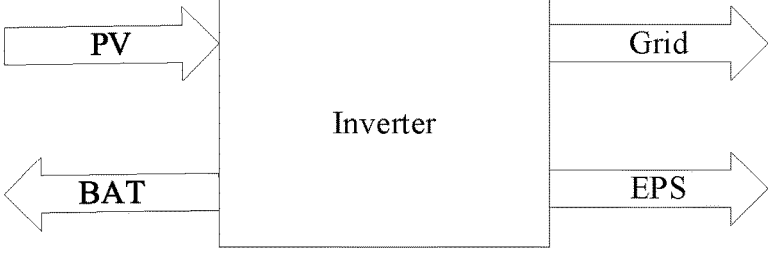
FIG. 2 is a block diagram showing devices in a simplified energy storage system.

FIG. 1 is simplified as illustrated in FIG. 2. The energy storage system includes an energy storage module interface (BAT), a photovoltaic module interface (PV), a power grid module interface (Grid), a load module interface (EPS), and an inverter module (Inverter). The energy storage module interface (BAT) includes the battery pack. The inverter module (Inverter) includes the DCDC bidirectional converter, the ACDC bidirectional converter, and the PV controller. The photovoltaic module interface (PV) includes the photovoltaic panel. In the energy storage system, when the power generated by the photovoltaic panel can meet demands of the load, the battery pack, and the power grid, a relationship between energies of a plurality of module interfaces can be expressed as $P_{Pv} \approx P_{eps} + P_{bat} + P_{grid}$, where $P_{Pv}$ represents an actual power corresponding to the photovoltaic module interface, $P_{eps}$ represents an actual power corresponding to the load module interface, $P_{bat}$ represents an actual power corresponding to the energy storage module interface, which may be an actual charging power or an actual discharging power. When $P_{bat}$ is a positive number, it means that the energy storage module interface is in a charging state, and when $P_{bat}$ is a negative number, it means that the energy storage module interface is in a discharging state. $P_{grid}$ represents an actual power corresponding to the power grid module interface. When $P_{grid}$ is a positive number, it means that the power grid absorbs electric energy from the energy storage system, and when $P_{grid}$ is a negative number, it means that the power grid transmits energy to the energy storage system. Since the electric energy has a predetermined loss during a transmission process, the actual power $P_{Pv}$ of the photovoltaic module interface in the energy storage system is approximately equal to a sum of the actual power $P_{eps}$ of the load module interface, the actual power $P_{bat}$ of the energy storage module interface, and the actual power $P_{grid}$ of the power grid module interface. In some embodiments, within an error range, such as 5%, the relationship between the energies of the plurality of module interfaces described above may be considered to be satisfied. That is, a difference between the actual power $P_{Pv}$ of the photovoltaic module interface in the energy storage system and the sum of the actual power $P_{eps}$ of the load module interface, the actual power $P_{bat}$ of the energy storage module interface, and the actual power $P_{grid}$ of the power grid module interface is less than or equal to 5%.

Figure 3:
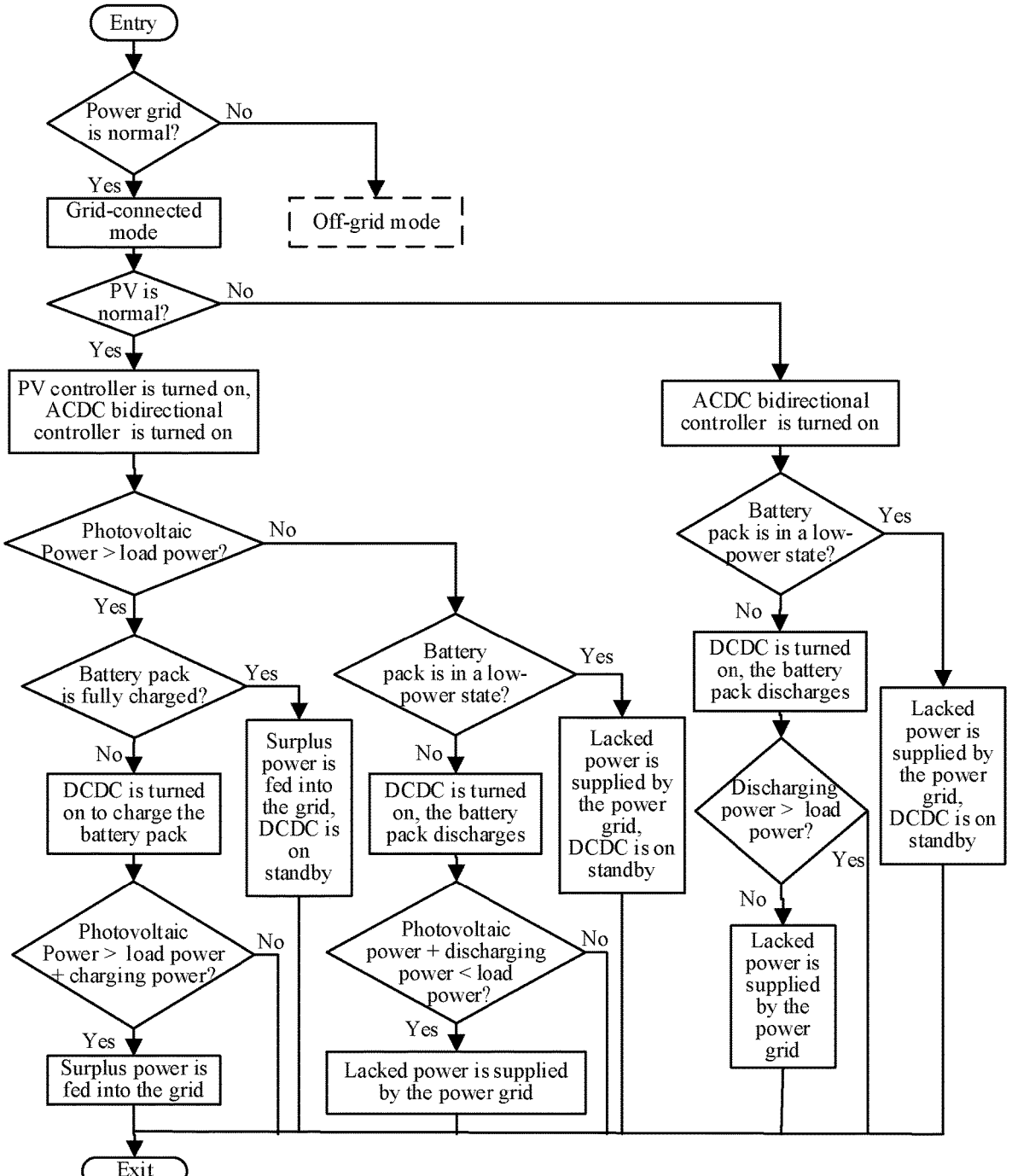
FIG. 3 is a flowchart illustrating a grid-connected state under a self-consumption mode in a conventional integrated control logic.

As illustrated in FIG. 3, FIG. 3 shows a flowchart of a grid-connected state in a self-consumption mode. A control method illustrated in FIG. 3 is a control method for a conventional energy management system, which is described in detail below.

When the process starts, it is necessary to determine whether the grid connection is normal and whether the photovoltaic module interface is normal in a grid-connected mode. When the photovoltaic module interface is normally connected, the PV controller is turned on to limit a power inputted to the photovoltaic module interface, and the ACDC bidirectional converter is turned on to realize conversion between alternating current and direct current in the energy storage system.

When a photovoltaic power is greater than a load power, it is determined whether the battery pack of the energy storage module interface in the energy storage system is fully charged. When the battery pack is fully charged, the DCDC bidirectional converter is on standby and does not participate in operation. Also, excess electric energy generated by the photovoltaic module interface is converted into an alternating current through the ACDC bidirectional converter and transmitted to the power grid module interface. When the battery pack is not fully charged, the DCDC bidirectional converter starts to convert a direct current generated by the photovoltaic module interface into a direct current that can be received by the battery pack, that is, the battery pack is charged. When the photovoltaic power is greater than a sum of the load power and a charging power, the excess electric energy is transmitted to the power grid module interface. If the photovoltaic power is less than the sum of the load power and the charging power, no further processing is performed.

When the photovoltaic power is less than or equal to the load power, it is determined whether the battery pack of the energy storage module interface is in a low-power state. If the battery pack of the energy storage module interface is in the low-power state, the power grid interface provides a power lacked by the photovoltaic power to the load module interface, the DCDC bidirectional converter is on standby, and the battery pack is not discharged. When the battery pack of the energy storage module interface is not in the low-power state, the DCDC bidirectional converter is turned on, and the battery pack is discharged to supplement the power lacked by the photovoltaic power. In this case, it is determined whether the power of the energy storage module interface meets the load power. If the power of the energy storage module interface does not meet the load power, the power grid module interface supplements lacked electrical energy to maintain the operation of the load module interface. If the power of the energy storage module interface meets the load power, the photovoltaic module interface and the energy storage module interface continue to supply power to the load module interface.

If the photovoltaic module interface receives an abnormal signal, subsequent to turning on the ACDC bidirectional controller, it is determined whether the battery pack is in the low-power state. If the battery pack is in the low-power state, the power grid module interface supplies power to the load module interface, and the DCDC bidirectional converter is on standby. If the battery pack is not in the low-power state, the DCDC bidirectional converter is turned on, and the battery pack is discharged, supplying energy to the load module interface. In this case, it is determined whether the power of the energy storage module interface meets the load power. If the power of the energy storage module interface does not meet the load power, the power grid module interface provides lacked electric energy to maintain the operation of the load module interface. If the power of the energy storage module interface meets the load power, the energy storage module interface continues to supply power to the load module interface.

The solution illustrated in FIG. 3 above is an energy control solution adopted by the conventional energy management system in the grid-connected state under the self-consumption mode. Through the above detailed analysis, it can be seen that the solution combines the power control management of each module among a photovoltaic module, a battery module, a load module, and a power grid module with the operation state management of each module to form the integrated control logic. This control logic is extremely complex and difficult to debug. In addition, the above solution only considers the grid-connected state under the self-consumption mode, and does not consider the control logic under a peak shaving and valley filling mode and an energy storage priority mode. If the control logic under different modes is added to the above integrated control logic, the complexity of the above integrated control logic increases exponentially, which is extremely unfavorable for later management and maintenance. Also, when a single point of failure occurs in the integrated control logic, the entire energy management system is unable to operate. Overall robustness of the integrated control logic is unsatisfactory.

Aiming at the technical problems provided in the background part and the above problems, the present disclosure provides an electric energy regulation method, an apparatus, an electronic device, and a storage medium. With the solution provided in the present disclosure, the interface power information corresponding to a plurality of module interfaces in the electric energy management system is determined based on different operating modes, the target dispatch power in the electric energy management system is determined based on the interface power information, and whether to obtain to-be-supplemented electric energy from the energy storage module interface or to transmit surplus electric energy to the energy storage module interface is determined based on the target dispatch power. By determining the control logic of the electric energy management system based on different operating modes, adverse effects caused by the integrated control logic are avoided. Moreover, the operating modes and the control logic of the module interfaces are independent of each other. As the operating modes or the module interfaces increase, the existing control logic is not affected, improving scalability of the electric energy management system.

Figure 9:
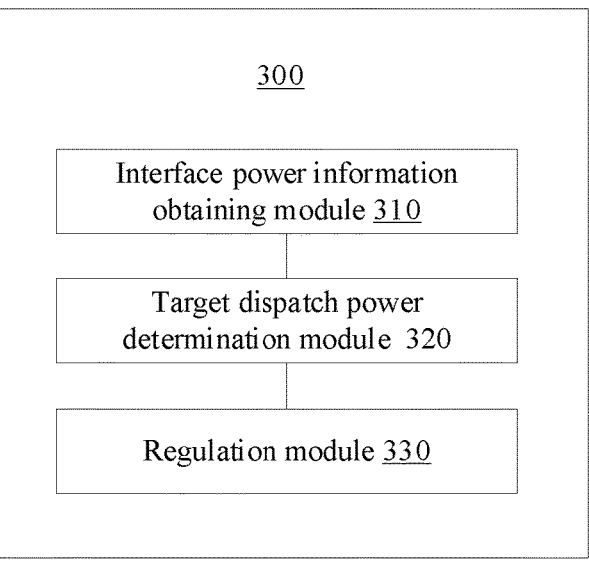
FIG. 9 is a block diagram showing a structure of an electric energy regulation apparatus according to an embodiment of the present disclosure.

As illustrated in FIG. 4, FIG. 4 illustrates a schematic flowchart of an electric energy regulation method according to an embodiment of the present disclosure. In a specific embodiment, the electric energy regulation method is applied to an electric energy regulation apparatus 300 as illustrated in FIG. 9 and an electronic device 100 equipped with the electric energy regulation apparatus 300.

The process illustrated in FIG. 4 will be described in detail below. The electric energy regulation method may specifically include the following operations at blocks.

At block S110, interface power information corresponding to each of the photovoltaic module interface, the load module interface, and the power grid module interface is selectively obtained based on a current operating mode of the electric energy management system. The interface power information includes a magnitude of interface power and a flow direction of the interface power.

The electric energy management system is configured to manage electric power among the photovoltaic module interface, the energy storage module interface, the load module interface, and the power grid module interface.

The photovoltaic module interface refers to an interface through which the photovoltaic module is connected to the electric energy management system. By obtaining interface power information at the photovoltaic module interface, a current actual power of the photovoltaic module, including a magnitude of interface power and a flow direction of the interface power of the photovoltaic module interface, can be obtained. In some embodiments, the flow direction of the interface power of the photovoltaic module interface may be represented by a positive sign and a negative sign of the current actual power of the photovoltaic module. When the obtained current actual power of the photovoltaic module interface is a positive number, it means that the flow direction of the interface power of the photovoltaic module interface is from the photovoltaic module to the electric energy management system. However, since the photovoltaic module is a power generation device, the current actual power of the photovoltaic module interface is not a negative number under normal situations. Therefore, when the obtained current actual power of the photovoltaic module interface is a negative number, it means that the photovoltaic module is abnormal.

The energy storage module interface refers to an interface through which the energy storage module is connected to the electric energy management system. The energy storage module is configured to store electric energy and may be a storage battery such as a lithium battery or a sodium battery. By obtaining interface power information at the energy storage module interface, a current actual power of the energy storage module interface, including a magnitude of interface power and a flow direction of the interface power of the energy storage module interface, can be obtained. In some embodiments, the flow direction of the interface power of the energy storage module interface may be represented by a positive sign and a negative sign of the current actual power of the energy storage module. When the obtained current actual power of the energy storage module interface is a positive number, it means that the energy storage module is in a charging state, and the flow direction of the interface power of the energy storage module interface is from the electric energy management system to the energy storage module. When the obtained current actual power of the energy storage module interface is a negative number, it means that the energy storage module is in a discharging state, and the flow direction of the interface power of the energy storage module interface is from the energy storage module to the electric energy management system.

The load module interface refers to an interface through which the load module is connected to the electric energy management system. The load module is a general term for one or more load devices connected to the electric energy management system that use the electric energy to operate. By obtaining interface power information at the load module interface, a current actual power of the load module interface, including a magnitude of interface power and a flow direction of the interface power of the load module interface, can be obtained. In some embodiments, the flow direction of the interface power of the load module interface may be represented by a positive sign and a negative sign of the current actual power of the load module. When the obtained current actual power of the load module interface is a positive number, the flow direction of the interface power of the load module interface is from the electric energy management system to the load module. However, since the load module is an electrical device, the current actual power of the load module interface is not a negative number under normal situations. Therefore, when the obtained current actual power of the load module interface is a negative number, it means that the load module is abnormal.

The power grid module interface refers to an interface through which the power grid module connected to the electric energy management system, and the power grid may be a mains grid. By obtaining interface power information at the power grid module interface, a current actual power of the power grid module interface, including a magnitude of interface power and a flow direction of the interface power of the power grid module interface, can be obtained. In some embodiments, the flow direction of the interface power of the power grid module interface may be represented by a positive sign or a negative sign of the current actual power of the power grid module. When the obtained current actual power of the power grid module interface is a positive number, the power grid module is in an energy absorption state, and the flow direction of the interface power of the power grid module interface is from the electric energy management system to the power grid module. When the obtained current actual power of the power grid module interface is a negative number, the power grid module is in an energy release state, and the flow direction of the interface power of the power grid module interface is from the power grid module to the electric energy management system.

In some embodiments, when the energy storage module interface fails, a maximum charging power and a maximum discharging power of the energy storage module interface are configured to 0. When a State of Charge of the energy storage module interface exceeds a first predetermined value, the maximum charging power of the energy storage module interface is configured to 0. When the State of Charge of the energy storage module interface is lower than a second predetermined value, the maximum discharging power of the energy storage module interface is configured to 0. The maximum charging power may refer to the maximum charging power that the energy storage module can withstand, specifically may be the maximum charging power that the storage battery can withstand. The maximum discharging power may refer to the maximum discharging power of the energy storage module, specifically may be the maximum discharging power of the storage battery.

When the energy storage module interface fails, the energy storage module interface can neither transmit the electric energy to the electric energy management system nor obtain the electric energy from the electric energy management system. A fault in the energy storage module interface may be a fault in the interface, a fault in the energy storage device, or a fault in the DCDC bidirectional converter. It should be understood that, the above fault types of the energy storage module interface are only used as examples, and the present disclosure does not limit the specific circumstances of the fault in the energy storage module interface. When the above fault occurs in the energy storage module interface, the electric energy management system provided by the present disclosure configures the maximum charging power and the maximum discharging power of the energy storage module interface to 0. In this case, the energy storage module interface can neither be charged nor discharged, and the to-be-supplemented electric power in the electric energy management system does not flow out from the energy storage module interface, and the surplus electric power in the electric energy management system does not flow to the energy storage module interface. In other words, when the energy storage module interface fails, subsequent to setting, by the electric energy management system, the maximum charging power and the maximum discharging power of the energy storage module interface to 0, the energy management in the electric energy management system excludes the energy storage module interface, and manages energy flow among the photovoltaic module interface, the load module interface, and the power grid module interface. Therefore, when the energy storage module interface fails, the other modules of the electric energy management system can still operate normally without being affected.

When the State of Charge of the energy storage module interface exceeds the first predetermined value, it means that the State of Charge (SOC) reaches a predetermined height value, and the energy storage device no longer continues to be charged. Therefore, the maximum charging power is set to 0. The first predetermined value may be 95% of a total capacity of the energy storage device, or 98% of the total capacity of the energy storage device. The first predetermined value may be determined by a user and is not specifically limited here.

When the State of Charge of the energy storage module interface is lower than the second predetermined value, it means that the energy storage device is continuously discharged, and the State of Charge is lower than the second predetermined value. In this case, the battery no longer continues to be discharged. Therefore, the maximum discharging power is set to 0. The second predetermined value may be the total capacity of the energy storage device*(1-Depth of Discharge). The Depth of Discharge is 95% or 98%. The Depth of Discharge represents a ratio of the electric energy currently released by the battery pack to the total capacity of the battery pack. In the solutions of the present disclosure, this ratio is expressed in a form of a percentage. It may also be expressed in a form of a decimal, and the representation is not specifically limited here.

When the State of Charge of the energy storage module interface exceeds the first predetermined value, it means that the energy storage capacity of the energy storage module has reached a configured maximum value and the energy storage module cannot continue to be charged; otherwise it affects a service life of the battery. Therefore, the electric energy management system configures the maximum charging power of the energy storage module interface to 0. By configuring the maximum charging power of the energy storage module interface to 0, the electric energy management system can stop charging the energy storage module. Similarly, when the State of Charge of the energy storage module interface is lower than the second predetermined value, it means that the energy storage module has released or almost released all the electric energy and cannot continue to be discharged; otherwise it affects the service life of the battery. Therefore, the electric energy management system configures the maximum discharging power of the energy storage module interface to 0. By configuring the maximum discharging power of the energy storage module interface to 0, the energy storage module can stop discharging to the electric energy management system.

As illustrated in FIG. 5, in a specific implementation process, FIG. 5 is a flowchart illustrating a battery charging and discharging power setting of an energy storage module interface of an energy storage system according to an embodiment of the present disclosure. It can be seen from FIG. 5 that subsequent to entering a setting process from a process entry, current State of Charge, Depth of Discharge of the battery, predetermined maximum charging power, and predetermined maximum discharging power in the energy storage module interface are obtained from a data storage device. It is determined whether a relationship between the State of Charge and the Depth of Discharge (DOD) satisfies SOC>1-DOD. If the relationship is met, it is further determined whether the SOC is less than the predetermined height value. When the SOC is less than the predetermined height value, it means that the energy storage module interface is not fully charged. Therefore, the energy storage module interface can be charged or discharged in this case. When the SOC is greater than or equal to the predetermined height value, it means that the energy storage module interface is fully charged in this case and cannot be charged. That is, the predetermined maximum charging power is 0, and only discharging can be performed. The discharging power is limited as desired and is not limited here. When SOC≤1-DOD, it means that the battery pack has released all the internally stored electric energy. That is, the maximum discharging power is 0. In this case, the energy storage module interface can only be charged and cannot be discharged.

In other embodiments, when the photovoltaic module interface fails, the current actual power of the photovoltaic module interface is configured to 0. A fault in the photovoltaic module interface indicates that the photovoltaic module interface fails to transmit electric energy to the electric energy management system. In this case, the current actual power corresponding to the photovoltaic module interface is configured to 0, to avoid affecting the control logic of other module interfaces. That is to say, in the event of the fault in the photovoltaic module interface, subsequent to configuring, by the electric energy management system, the current actual power corresponding to the photovoltaic module interface to 0, the energy management in the electric energy management system excludes the photovoltaic module interface, and manages the energy flow among the energy storage module interface, the load module interface, and the power grid module interface. Therefore, when the photovoltaic module interface fails, other modules of the electric energy management system can still operate normally without being affected.

In the embodiments of the present disclosure, when one or more module interfaces in the electric energy management system fail, the other module interfaces can still operate normally, which solves a problem that the electric energy management system is unable to operate when any module interface in the electric energy management system fails in the related technology, thereby making electric energy management of the electric energy management system more intelligent and improving user experience.

At block S120, a target dispatch power in the electric energy management system is determined based on the magnitude of the interface power and the flow direction of the interface power in the interface power information corresponding to each interface obtained selectively. The target dispatch power is a power that the electric energy management system requires the energy storage module interface to supply or absorb energy. In the embodiments of the present disclosure, the operating mode includes a self-consumption mode, a peak shaving and valley filling mode, and an energy storage priority mode.

It should be understood that, the electric energy management system manages energy among the photovoltaic module interface, the energy storage module interface, the load module interface, and the power grid module interface. The current actual power of the photovoltaic module interface mainly depends on external factors such as current light intensity and temperature. The current actual power of the energy storage module interface mainly depends on current power consumption of the electrical device connected to the system. The power grid module interface mainly depends on the current operating mode of the electric energy management system and the power information of power flow configuration of the mains grid. It can be seen that the management performed by the electric energy management system on the photovoltaic module interface, the energy storage module interface, and the power grid module interface is more passive. Therefore, subsequent to selectively obtaining, by the electric energy management system, the interface power information of the photovoltaic module interface, the load module interface, and the power grid module interface based on different operating modes, the target dispatch power that the electric energy management system needs to supplement or absorb can be determined based on the interface power information obtained selectively, and the electric energy management system invokes the energy storage module interface to supply or absorb energy based on the target dispatch power.

The following is an explanation of the calculation process of the target dispatch power of the electric energy management system under different operating modes.

The self-consumption mode means that the electric energy in the electric energy management system is obtained from the photovoltaic module interface, and this electric energy is configured to meet power demands of the energy storage module and the load module. If the electric energy management system has surplus electric energy, the surplus electric energy is transmitted to the power grid module interface. If the electric energy management system fails to meet the power demand of the load module interface by invoking the energy storage module, power can be supplemented from the power grid module interface. It should be understood that, under the self-consumption mode, the power grid module has no mandatory requirements for the flow setting power of the electric energy management system. Under the self-consumption mode, the excess power generated by photovoltaic power generation can be fed into the grid, and the lacked power is supplemented from the power grid if the energy storage module fails to supplement the lacked power.

Under the self-consumption mode, since the power grid module has no rigid requirements for the flow setting power of the electric energy management system, only the current actual power of the photovoltaic module interface and the load module interface can be obtained under this mode. The target dispatch power in the electric energy management system can be determined based on the difference between the current actual power of the photovoltaic module interface and the current actual power of the load module interface. The current actual power of the load module interface is determined based on a load device connected to the load module interface and an operating condition of the load device.

Specifically, under the self-consumption mode, a formula for obtaining the target dispatch power P is: $P=P_{pv}-P_{eps}$, where $P_{PV}$ represents the current actual power of the photovoltaic module interface, and $P_{eps}$ represents the current actual power of the load module interface.

In some embodiments, under the self-consumption mode, if the calculated target dispatch power P is a positive number, it means that the photovoltaic electricity generation power is greater the load consumption power, and there is the surplus electric power in the electric energy management system. Therefore, the electric energy management system needs to invoke the energy storage module interface to absorb energy based on the target dispatch power, that is, the energy storage module interface is invoked for charging. In other embodiments, when the target dispatch power is greater than the maximum charging power of the energy storage module interface (a charging direction is set to positive), the charging power of the energy storage module interface is set to the maximum charging power. In this case, the energy storage module interface maintains the maximum charging power to absorb the electric energy from the electric energy management system. If the calculated target dispatch power P is a negative number, it means that the photovoltaic power generation capacity is less than the load consumption power, and the electric energy management system needs to supplement power. Therefore, the electric energy management system needs to invoke the energy storage module interface to supply energy based on the target dispatch power. That is, the energy storage module interface is invoked for discharging. In yet other embodiments, when the target dispatch power is less than the maximum discharging power of the energy storage module interface (a discharging direction is set to negative), the discharging power of the energy storage module interface is set to the maximum discharging power. In this case, the energy storage module interface maintains the maximum discharging power to discharge to the electric energy management system.

The peak shaving and valley filling mode means that during a peak power consumption period of the power grid, the power demand of the power grid connected to the power grid module interface is too large, and the electric energy management system needs to supply energy to the power grid with a larger peak shaving and valley filling power. The electric energy generated by the photovoltaic module in the electric energy management system is not only supplied to the energy storage module and the load module, but also to the power grid with a flow setting power. During a low power consumption period of the power grid, the power demand of the power grid is reduced, and the electric energy management system can transmit energy to the power grid with a smaller flow setting power or stop transmitting the energy to the power grid. Even when the energy consumption demand of the load connected to the load module interface in the electric energy management system is too large, the power grid can transmit the energy to the electric energy management system with the flow setting power to maintain stable and sufficient electric energy in the electric energy management system.

Under the peak shaving and valley filling mode, since the electric energy management system also needs to supply or supplement power to the power grid module with a current grid flow setting power, the electric energy management system needs to obtain the current actual power of the photovoltaic module interface, the current actual power of the load module interface, and the current grid flow setting power of the power grid module interface under this mode. The target dispatch power in the electric energy management system is determined based on a difference between the current actual power of the photovoltaic module interface and a sum of the current actual power of the load module interface and the current grid flow setting power of the power grid module interface.

Specifically, under the peak shaving and valley filling mode, a formula for obtaining the target dispatch power P of the electric energy management system is: $P=P_{pv}-P_{eps}-P_{gset}$, where $P_{PV}$ represents the current actual power of the photovoltaic module interface, $P_{eps}$ represents the current actual power of the load module interface, and $P_{gset}$ represents the current grid flow setting power of the power grid module interface. The current grid flow setting power can be set as desired. When the current grid flow setting power $P_{gset}$ is a positive number, it means that the power grid module absorbs power from the electric energy management system with the current grid flow setting power $P_{gset}$. If the current grid flow setting power $P_{gset}$ is a negative number, it means that the power grid module discharges power to the electric energy management system with the current grid flow setting power $P_{gset}$.

In some embodiments, under the peak shaving and valley filling mode, if the calculated target dispatch power P is a positive number, it means that the photovoltaic power generation capacity is greater than a sum of the load consumption power and the current flow setting power of the power grid module, and there is the surplus electric power in the electric energy management system. Therefore, the electric energy management system needs to invoke the energy storage module interface to absorb energy based on the target dispatch power, that is, the energy storage module interface is invoked for charging. In other embodiments, when the target dispatch power is greater than the maximum charging power of the energy storage module interface (the charging direction is set to positive), the charging power of the energy storage module interface is set to the maximum charging power. In this case, the energy storage module interface maintains the maximum charging power to absorb the electric energy from the electric energy management system. If the calculated target dispatch power P is a negative number, it means that the photovoltaic power generation capacity is less than the sum of the load consumption power and the current flow setting power of the power grid module. The electric energy management system needs to supplement power. Therefore, the electric energy management system needs to invoke the energy storage module interface to supply energy based on the target dispatch power, that is, the energy storage module interface is invoked for discharging. In yet other embodiments, when the target dispatch power is less than the maximum discharging power of the energy storage module interface (the discharging direction is set to negative), the discharging power of the energy storage module interface is set to the maximum discharging power. In this case, the energy storage module interface maintains the maximum discharging power to discharge power to the electric energy management system.

The energy storage priority mode means that the electric energy management system obtains electric energy from the photovoltaic module interface and/or the power grid module interface, gives priority to charging the energy storage module corresponding to the energy storage module interface, and gives priority to ensuring that the energy storage module is charged as fully as possible or reaches a predetermined maximum power threshold. It should be understood that, under the energy storage priority mode, the power grid module has no mandatory requirements for the flow setting power of the electric energy management system. Under the energy storage priority mode, the excess power generated by photovoltaic power generation can be fed into the grid, and the lacked power is supplemented from the power grid if the energy storage module fails to supplement the lacked power.

Under the energy storage priority mode, since the power grid module has no rigid requirements for the flow setting power of the electric energy management system, only the current actual power of the photovoltaic module interface and the load module interface can be obtained under this mode. Therefore, the target dispatch power in the electric energy management system can be determined based on the difference between the current actual power of the photovoltaic module interface and the current actual power of the load module interface.

Specifically, under the energy storage priority mode, a formula for obtaining the target dispatch power P may be: $P=P_{pv}-P_{eps}$, where $P_{PV}$ represents the current actual power of the photovoltaic module interface, and $P_{eps}$ represents the current actual power of the load module interface.

In some embodiments, under the energy storage priority mode, if the calculated target dispatch power P is a positive number, it means that the photovoltaic power generation capacity is greater than the load consumption power, and there is the surplus electric power in the electric energy management system. Therefore, the electric energy management system needs to invoke the energy storage module interface to absorb energy, that is, the energy storage module interface is invoked for charging. Since the energy storage priority mode needs to give priority to charging the energy storage module and to ensuring that the energy storage module is charged as fully as possible or reaches the predetermined maximum power threshold, the electric energy management system can always configure the charging power of the energy storage module interface to the maximum charging power, and the electric energy of the energy storage module interface can come from the photovoltaic module or the power grid module. If the calculated target dispatch power P is a negative number, it means that the photovoltaic power generation capacity is less than the load consumption power, and the electric energy management system needs to supplement power. Therefore, the electric energy management system needs to invoke the energy storage module interface to supply energy based on the target dispatch power, that is, the energy storage module interface is invoked for discharging. In other embodiments, when the target dispatch power is less than the maximum discharging power of the energy storage module interface (the discharging direction is set to negative), the discharging power of the energy storage module interface is set to the maximum discharging power. In this case, the energy storage module interface maintains the maximum discharging power to discharge to the electric energy management system.

Under the above self-consumption mode or energy storage priority mode, when a power grid anti-backflow function of the electric energy management system is enabled, a maximum power released to the grid of the power grid module interface is configured to 0. To prevent the excess electric energy in the electric energy management system from being transmitted to the power grid module interface under the self-consumption mode or under the energy storage priority mode, the power grid anti-backflow function is enabled, and the corresponding maximum power released to the grid of the power grid module interface is configured to be 0 in this case, which is conducive to circular utilization of the electric energy in the electric energy management system.

Details of the PV limitation operation, implemented when the power generation of the photovoltaic module interface is large, are described in the following.

During an implementation process, when an energy supply power of the photovoltaic module interface exceeds a sum of tolerable powers of the energy storage module interface, the load module interface, and the power grid module interface under the current operating mode of the electric energy management system, the energy supply power of the photovoltaic module interface is limited to be less than or equal to the sum of the tolerable powers. When the sum of the tolerable powers exceeds a maximum energy supply power of the photovoltaic module interface, the energy supply power of the photovoltaic module interface is limited to be less than or equal to the maximum energy supply power. In some embodiments, the electricity generation power of the photovoltaic module can be limited by maximum power point tracking (MPPT).

The sum of the tolerable powers of the energy storage module interface, the load module interface, and the power grid module interface varies under different operating modes. The sum of the tolerable powers of the energy storage module interface, the load module interface, and the power grid module interface under the self-consumption mode is the same as that under the energy storage priority mode, the sum is the sum of the current actual power $P_{eps}$ of the load module interface, the maximum charging power $P_{chgMax}$ of the energy storage module interface, and the maximum power $P_{goutset}$ released to the grid of the power grid module interface. Under the peak shaving and valley filling mode, the sum of the tolerable powers of the energy storage module interface, the load module interface, and the power grid module interface is the sum of the current actual power $P_{eps}$ of the load module interface, the maximum charging power $P_{chgMax}$ of the energy storage module interface, and the current grid flow setting power $P_{gset}$.

Therefore, under the self-consumption mode and the energy storage priority mode, when the energy supply power of the photovoltaic module interface exceeds the sum of the maximum charging power of the energy storage module interface, the current actual power of the load module interface, and the maximum power released to the grid of the power grid module interface, the energy supply power of the photovoltaic module interface is limited to the sum of the maximum charging power of the energy storage module interface, the current actual power of the load module interface, and the maximum power released to the grid of the power grid module interface. Specifically, the maximum energy supply power $P_{PvMax}$ of the photovoltaic module interface may be $P_{PvMax}=P_{eps}+P_{chgMax}+P_{goutset}$, and the actual energy supply power $P_{Pv}$ of the photovoltaic module interface is less than or equal to $P_{PvMax}$.

Under the peak shaving and valley filling mode, when the energy supply power of the photovoltaic module interface exceeds the sum of the maximum charging power of the energy storage module interface, the current actual power of the load module interface, and the current grid flow setting power of the power grid module interface, the energy supply power of the photovoltaic module interface is limited to be less than or equal to the sum of the maximum charging power of the energy storage module interface, the current actual power of the load module interface, and the current grid flow setting power of the power grid module interface. Specifically, the maximum energy supply power $P_{PvMax}$ of the photovoltaic module interface may be $P_{PvMax}=P_{eps}+P_{chgMax}+P_{gset}$, and the actual energy supply power $P_{Pv}$ of the photovoltaic module interface is less than or equal to $P_{PvMax}$.

The above electric energy management system limits the maximum energy supply power of the photovoltaic module interface to the sum of the tolerable powers of the energy storage module interface, the load module interface, and the power grid module interface under the different operating modes, preventing damage to the energy storage module interface, the load module interface, or the power grid module interface caused by excessive energy supply power of the photovoltaic module interface.

In some embodiments, when the maximum energy supply power $P_{PvMax}$ of the photovoltaic module interface determined based on the above different operating modes is greater than the maximum photovoltaic electricity generation power $P_{MPPT}$ determined by the photovoltaic module based on the maximum power point tracking (MPPT), the maximum energy supply power $P_{PvMax}$ of the photovoltaic module interface is limited to be less than or equal to $P_{MPPT}$ to avoid damage to the photovoltaic module.

At block S130, a to-be-supplemented electric power or a surplus electric power of the electric energy management system is determined based on the target dispatch power, and the energy storage module interface is invoked to supply energy based on the to-be-supplemented electric power or absorb energy based on the surplus electric power.

When the target dispatch power is a negative number, it means that the electric energy management system needs to supplement the electric power from the energy storage module interface. Therefore, the electric energy management system invokes the energy storage module interface to discharge and supply energy to supplement the to-be-supplemented electric power of the electric energy management system. When the target dispatch power is a positive number, it means that the electric energy management system has the surplus electric power that needs to be absorbed through the energy storage module interface. Therefore, the electric energy management system invokes the energy storage module interface to absorb the surplus electric power from the electric energy management system.

In some embodiments, when an absolute value of the to-be-supplemented electric power exceeds an absolute value of a maximum discharging power of the energy storage module interface, an absolute value of an energy supply power of the energy storage module interface is configured to be an absolute value of a predetermined maximum discharging power. When an absolute value of the surplus electric power exceeds an absolute value of a predetermined maximum charging power of the energy storage module interface, an absolute value of an energy absorption power of the energy storage module interface is configured to be the absolute value of the predetermined maximum charging power. Through the above operations, the energy storage module can be effectively protected, avoid damage to the energy storage module caused by exceeding the maximum discharging power and the maximum charging power of the energy storage module.

In some embodiments, the operation state of the electric energy management system can be determined based on the current operating mode and the target dispatch power of the electric energy management system, which is described as follows.

Figure 6:
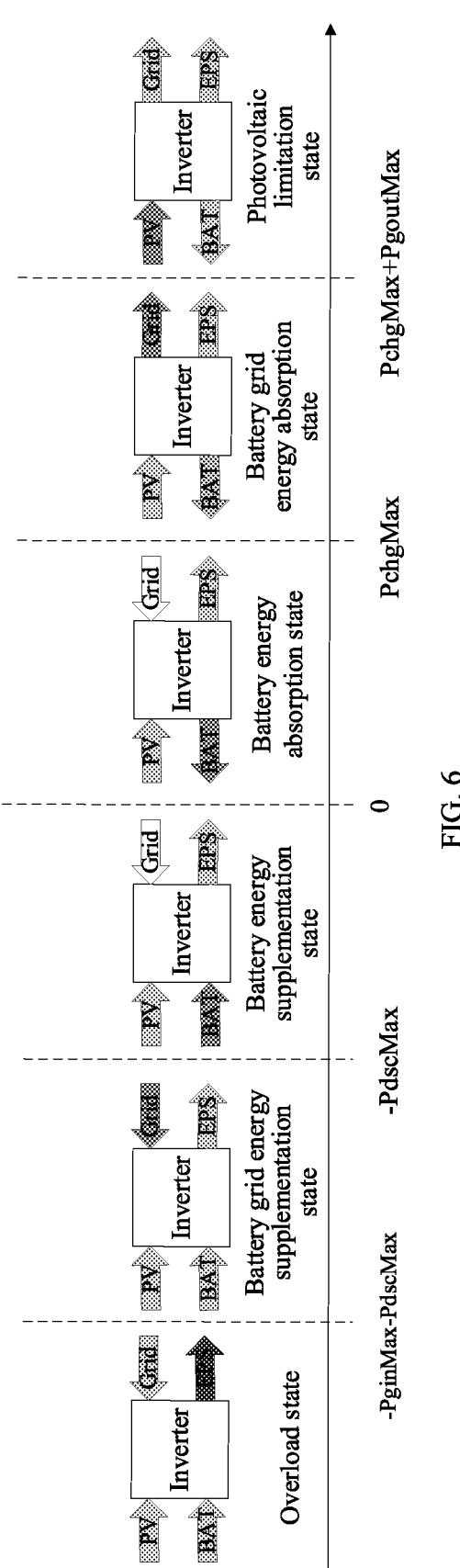
FIG. 6 is a diagram showing an energy interaction of a plurality of module interfaces in an energy storage system under a self-consumption mode.

In the specific implementation process, as illustrated in FIG. 6, FIG. 6 is a diagram showing an energy interaction of a plurality of module interfaces in an energy storage system under a self-consumption mode. As can be seen from FIG. 6, the photovoltaic module interface (PV), the energy storage module interface (BAT), the power grid module interface (Grid), and the load module interface (EPS) are all connected through the inverter module (Inverter) to form the energy storage system. The inverter module (Inverter) includes an inverter, which can convert direct current electric energy into fixed-frequency fixed-voltage or frequency-modulated voltage-modulated alternating current. In FIG. 6, directions of arrows refer to main energy source directions and main energy output directions of this module. Continuing to refer to FIG. 6, under the self-consumption mode, based on the target dispatch power $P=P_{pv}-P_{eps}$ of the electric energy management system under the self-consumption mode as a judgment criterion, the electric energy management system includes six operation states, which are a battery energy supplementation state, a battery grid energy supplementation state, an overload state, a battery energy absorption state, a battery grid energy absorption state, a photovoltaic limitation state.

When the target dispatch power $P\in[-P_{dscMax}, 0)$, the electric energy management system is in the battery energy supplementation state. Under this state, by calculating the target dispatch power, the electric energy management system determines that the electricity generation power of the photovoltaic module interface cannot meet the consumption power of the load module interface, and a difference between the power generation capacity of the photovoltaic module interface and the consumption power of the load module interface is less than or equal to the maximum discharging power of the energy storage module interface. Therefore, the electric energy management system invokes the energy storage module interface to supplement the to-be-supplemented electric power, meeting the power demand of the load module interface.

When the target dispatch power $P \in [-P_{ginMax} - P_{dscMax}, -P_{dscMax})$, the electric energy management system is in the battery grid energy supplementation state. Under this state, by calculating the target dispatch power, the electric energy management system determines that a sum of the power generation capacity of the photovoltaic module interface and the maximum discharging power of the energy storage module interface cannot meet the consumption power of the load module interface, the consumption power lacked by the load module interface is less than or equal to a maximum power that the power grid module interface absorbs the energy from the power grid. Therefore, the electric energy management system invokes both the energy storage module interface and the power grid module interface to supply power simultaneously, meeting the power demand of the load module interface.

When the target dispatch power $P \in (-\infty, -P_{ginMax} - P_{dscMax})$, the electric energy management system is in the overload state. Under this state, by calculating the target dispatch power, the electric energy management system determines that the sum of the electricity generation power of the photovoltaic module interface, the maximum discharging power of the energy storage module interface, and the maximum power that the power grid module interface absorbs the energy from the power grid cannot meet the power demand of the load module interface. Therefore, it means that the load in the electric energy management system is too large. In some embodiments, tripping and circuit breaking may be employed to avoid damage to the electric energy management system.

When the target dispatch power $P \in (0, P_{chgMax}]$, the electric energy management system is in the battery energy absorption state. Under this state, by calculating the target dispatch power, the electric energy management system determines that the power generation capacity of the photovoltaic module interface exceeds the power demand of the load module interface, and the surplus electric power is still less than or equal to the maximum charging power of the energy storage module interface. Therefore, the electric energy management system invokes the energy storage module interface to absorb the surplus electric power, achieving power flow balance in the electric energy management system.

When the target dispatch power $P \in (P_{chgMax}, P_{chgMax} + P_{goutMax}]$, the electric energy management system is in the battery grid energy absorption state. Under this state, by calculating the target dispatch power, the electric energy management system determines that the power generation capacity of the photovoltaic module interface exceeds the power demand of the load module interface, and the surplus electric power exceeds the maximum charging power of the energy storage module interface but does not exceed the sum of the maximum charging power of the energy storage module interface and the maximum power released to the grid of the power grid module interface. Therefore, the electric energy management system can invoke both the energy storage module interface and the power grid module interface to absorb the surplus electric power. In some embodiments, the electric energy management system can give priority to the energy storage module interface to absorb the surplus electric power with its maximum charging power, and the remaining electric power is released to the power grid through the power grid module interface.

When the target dispatch power $P \in (P_{chgMax} + P_{goutMax}, +\infty)$, the electric energy management system is in the photovoltaic limitation state. Under this state, by calculating the target dispatch power, the electric energy management system determines that the power generation capacity of the photovoltaic module interface exceeds the power demand of the load module interface, and the surplus electric power exceeds the sum of the maximum charging power of the energy storage module interface and the maximum power released to the grid of the power grid module interface. Therefore, the electric energy management system can perform PV limitation on the photovoltaic module interface, that is, the maximum power generation amount of the photovoltaic module is limited. In some embodiments, maximum power point tracking (MPPT) limitation may be applied to the photovoltaic module.

In some embodiments, prior to invoking the energy storage module interface to discharge and supplement the to-be-supplemented electric power, the electric energy management system also determines whether a Depth of Discharge of the energy storage module interface is lower than a predetermined minimum threshold, for example, whether the electricity amount is lower than 5%. If the electricity amount is lower than 5%, it means that the energy storage module interface has reached its discharging limit. Therefore, the maximum discharging power of the energy storage module interface is configured to 0, in such a manner that the energy storage module interface cannot be discharged.

In some embodiments, prior to invoking the energy storage module interface to charge and absorb the surplus electric power, the electric energy management system also determines whether a State of Charge of the energy storage module interface is higher than a predetermined maximum threshold, for example, whether the electricity amount is higher than 95%. If the electricity amount is higher than 95%, it means that the energy storage module interface has reached its charging limit. Therefore, the maximum charging power of the energy storage module interface is configured to 0, in such a manner that the energy storage module interface cannot be charged.

Figure 7:
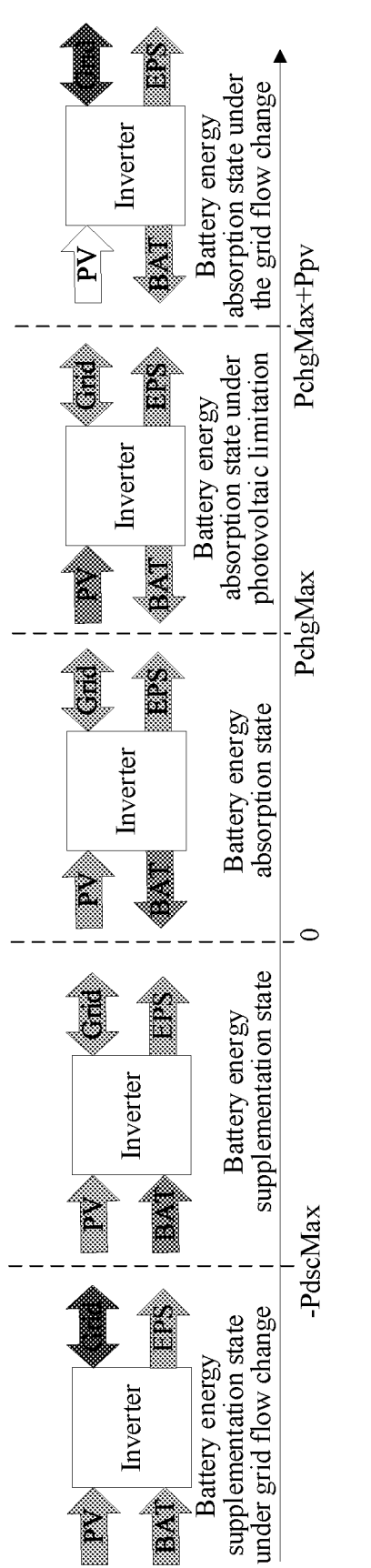
FIG. 7 is a diagram showing an energy interaction of a plurality of module interfaces in an energy storage system under a peak shaving and valley filling mode.

As illustrated in FIG. 7, FIG. 7 is a diagram showing an energy interaction of a plurality of module interfaces in an energy storage system under a peak shaving and valley filling mode. Under the peak shaving and valley filling mode, based on the target dispatch power $P = P_{pv} - P_{eps} - P_{gset}$ of the electric energy management system under the peak shaving and valley filling mode as the judgment criterion, the electric energy management system includes five operation states, which are a battery energy supplementation state under grid flow change, a battery energy supplementation state, a battery energy absorption state, a battery energy absorption state under photovoltaic limitation, and a battery energy absorption state under the grid flow change.

When the target dispatch power $P \in [-P_{dscMax}, 0)$, the electric energy management system is in the battery energy supplementation state. Under this state, by calculating the target dispatch power, the electric energy management system determines that the power generation capacity of the photovoltaic module interface cannot meet the consumption power of the load module interface and the grid flow setting power under grid flow, but a difference between the power generation capacity of the photovoltaic module interface and a sum of the consumption power of the load module interface and the grid flow setting power under grid flow is less than or equal to the maximum discharging power of the energy storage module interface. Therefore, the electric energy management system invokes the energy storage module interface to supplement the to-be-supplemented electric power, thereby meeting the power demand of the load module interface and the power grid module interface under the grid flow change.

When the target dispatch power $P \in (-\infty, -P_{dscMax})$, the electric energy management system is in the battery energy supplementation state under the grid flow change. Under this state, by calculating the target dispatch power, the electric energy management system determines that a sum of the power generation capacity of the photovoltaic module interface and the maximum discharging power of the energy storage module interface cannot meet the consumption power of the load module interface and the grid flow setting power under the grid flow. Therefore, it means that a power needs to be released to the grid of the electric energy management system is too high, and the energy storage module interface and the photovoltaic module interface cannot bear it. In some embodiments, the grid flow power can be reduced to transmit more electric energy to the load module interface, ensuring normal operation of the load corresponding to the load module interface.

When the target dispatch power $P \in (0, P_{chgMax}]$, the electric energy management system is in the battery energy absorption state. Under this state, by calculating the target dispatch power, the electric energy management system determines that the power generation capacity of the photovoltaic module interface exceeds the consumption power of the load module interface and the grid flow setting power under the grid flow, and the surplus electric power is still less than or equal to the maximum charging power of the energy storage module interface. Therefore, the electric energy management system invokes the energy storage module interface to absorb the surplus electric power, thereby achieving power flow balance in the electric energy management system.

When the target power call $P \in (P_{chgMax}, P_{chgMax}+P_{pv}]$, the electric energy management system is in the battery energy absorption state under the photovoltaic limitation. Under this state, by calculating the target dispatch power, the electric energy management system determines that the power generation capacity of the photovoltaic module interface exceeds the power demand of the load module interface, and the surplus electric power also exceeds the maximum charging power of the energy storage module interface but does not exceed a sum of the maximum charging power of the energy storage module interface and a limited power of the photovoltaic module interface. Therefore, the electric energy management system can invoke the energy storage module interface to limit an actual output power of the photovoltaic module interface in addition to absorbing the surplus electric power. In some embodiments, the maximum power point tracking (MPPT) limitation may be applied to the photovoltaic module.

When the target power call $P \in (P_{chgMax}+P_{pv}, +\infty)$, the electric energy management system is in the battery energy absorption state under the grid flow change. Under this state, by calculating the target dispatch power, the electric energy management system determines that electric energy transmitted by the power grid module interface to the electric energy management system under the grid flow change exceeds the power demand of the load module interface, and the surplus electric power exceeds the maximum charging power of the energy storage module interface.

Figure 8:
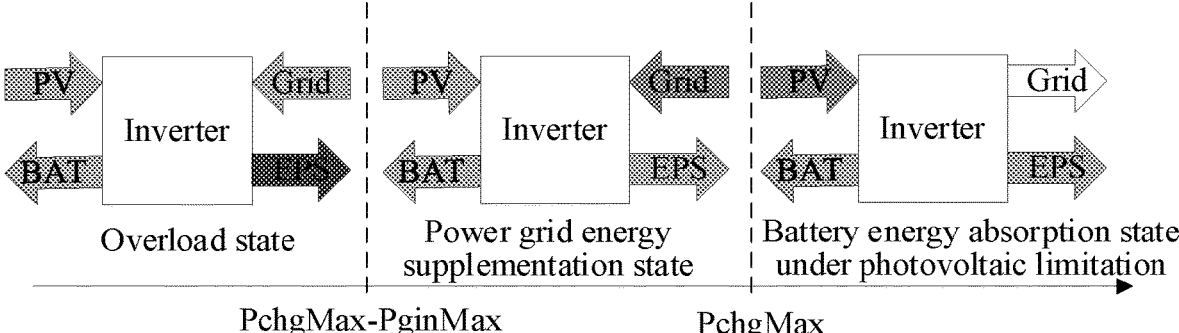
FIG. 8 is a diagram showing an energy interaction of a plurality of module interfaces in an energy storage system under an energy storage priority mode.

As illustrated in FIG. 8, FIG. 8 is a diagram showing an energy interaction of a plurality of module interfaces in an energy storage system under an energy storage priority mode. Under the energy storage priority mode, based on the target dispatch power $P = P_{pv} - P_{eps}$ of the electric energy management system under the energy storage priority mode as the judgment criterion, the electric energy management system includes three operation states, which are an overload state, a power grid energy supplementation state, and a battery energy absorption state under photovoltaic limitation.

When the target dispatch power $P \in [P_{chgMax}-P_{ginMax}, P_{chgMax})$, the electric energy management system is in the power grid energy supplementation state. Under this state, by calculating the target dispatch power, the electric energy management system determines that the sum of the power generation capacity of the photovoltaic module interface and the maximum discharging power of the energy storage module interface cannot meet the consumption power of the load module interface, the consumption power lacked by the load module interface is less than or equal to the maximum power that the power grid module interface absorbs the energy from the power grid. Therefore, the electric energy management system invokes the energy storage module interface and the power grid module interface to supply power, thereby meeting the power demand of the load module interface.

When the target dispatch power $P \in (-\infty, P_{chgMax}-P_{ginMax})$, the electric energy management system is in the overload state. Under this state, by calculating the target dispatch power, the electric energy management system determines that the sum of the power generation capacity of the photovoltaic module interface, the maximum discharging power of the energy storage module interface, and the maximum power that the power grid module interface absorbs the energy from the power grid cannot meet the power demand of the load module interface. Therefore, it means that the load in the electric energy management system is too large. In some embodiments, tripping and circuit breaking may be employed to avoid damage to the electric energy management system.

When the target dispatch power $P \in (P_{chgMax}, +\infty)$, the electric energy management system is in the battery energy absorption state under the photovoltaic limitation. Under this state, by calculating the target dispatch power, the electric energy management system determines that the power generation capacity of the photovoltaic module interface exceeds the power demand of the load module interface, and the surplus electric power exceeds the maximum charging power of the energy storage module interface. Therefore, the photovoltaic module interface is restricted to limit the power generation capacity of the photovoltaic module interface to be less than or equal to the maximum charging power of the load module interface and the battery module interface. The electric energy management system invokes the energy storage module interface to absorb the surplus electric power, thereby achieving the power flow balance in the electric energy management system. In some embodiments, the maximum power point tracking (MPPT) limitation may be applied to the photovoltaic module.

In some embodiments, the current operating mode and the target dispatch power of the electric energy management system can also be inferred based on the operation state of the electric energy management system. When a fault is detected in a predetermined operation state, it can be quickly located, saving fault location time, which solving the problem of difficult fault location caused by the integrated control logic.

With the solution provided in the present disclosure, the interface power information corresponding to a plurality of module interfaces in the electric energy management system is determined based on different operating modes, the target dispatch power in the electric energy management system is determined based on the interface power information, and whether to obtain to-be-supplemented electric energy from the energy storage module interface or to transmit surplus electric energy to the energy storage module interface is determined based on the target dispatch power. By determining the control logic of the electric energy management system based on different operating modes, adverse effects caused by the integrated control logic are avoided. Moreover, the operating modes and the control logic of the module interfaces are independent of each other. As the operating modes or the module interfaces increase, the existing control logic is not affected, improving scalability of the electric energy management system.

As illustrated in FIG. 9, FIG. 9 is a block diagram showing a structure of an electric energy regulation apparatus 300 according to an embodiment of the present disclosure. The electric energy regulation apparatus 300 is applied to an electronic device 100 and includes an interface power information obtaining module 310, a target dispatch power determination module 320, and a regulation module 330. The interface power information obtaining module 310 is configured to selectively obtain interface power information corresponding to each of the photovoltaic module interface, the load module interface, and the power grid module interface based on a current operating mode of the electric energy management system. The interface power information includes a magnitude of interface power and a flow direction of the interface power. The target dispatch power determination module 320 is configured to determine a target dispatch power in the electric energy management system based on the magnitude of the interface power and the flow direction of the interface power in the interface power information corresponding to each interface obtained selectively. The target dispatch power is a power that the electric energy management system requires the energy storage module interface to supply or absorb energy. The regulation module 330 is configured to determine a to-be-supplemented electric power or a surplus electric power of the electric energy management system based on the target dispatch power, and invoke the energy storage module interface to supply energy based on the to-be-supplemented electric power or absorb energy based on the surplus electric power.

In some embodiments of the present disclosure, the electric energy regulation apparatus 300 further includes: an energy supply power determination module for the energy storage module interface, which is configured to configure, when an absolute value of the to-be-supplemented electric power exceeds an absolute value of a predetermined maximum discharging power of the energy storage module interface, an absolute value of an energy supply power of the energy storage module interface to be the absolute value of the predetermined maximum discharging power; and an energy absorption power determination module for the energy storage module interface, which is configured to configure, when an absolute value of the surplus electric power exceeds an absolute value of a predetermined maximum charging power of the energy storage module interface, an absolute value of an energy absorption power of the energy storage module interface to be the absolute value of the predetermined maximum charging power.

In some embodiments of the present disclosure, the electric energy regulation apparatus 300 further includes: a power configuration module for a case that the energy storage module interface fails, which is configured to configure, when the energy storage module interface fails, a maximum charging power and a maximum discharging power of the energy storage module interface to 0; a power configuration module for a case that a State of Charge of the energy storage module interface exceeds a first predetermined value, which is configured to configure, when a State of Charge of the energy storage module interface exceeds a first predetermined value, the maximum charging power of the energy storage module interface to 0; and a power configuration module for a case that the State of Charge of the energy storage module interface is lower than a second predetermined value, which is configured to configure, when the State of Charge of the energy storage module interface is lower than a second predetermined value, the maximum discharging power of the energy storage module interface to 0.

In some embodiments of the present disclosure, the operating mode includes: a self-consumption mode, a peak shaving and valley filling mode, and an energy storage priority mode.

In some embodiments of the present disclosure, the interface power information obtaining module 310 includes: a data obtaining module for the self-consumption mode, which is configured to obtain a current actual power of each of the photovoltaic module interface and the load module interface under the self-consumption mode. The target dispatch power determination module 320 includes a target dispatch power determination module for the self-consumption mode, which is configured to determine the target dispatch power in the electric energy management system based on a difference between the current actual power of the photovoltaic module interface and the current actual power of the load module interface.

In some embodiments of the present disclosure, the interface power information obtaining module 310 includes: a data obtaining module for the peak shaving and valley filling mode, which is configured to obtain a current actual power of the photovoltaic module interface, a current actual power of the load module interface, and a current grid flow setting power of the power grid module interface under the peak shaving and valley filling mode. The target dispatch power determination module 320 includes a target dispatch power determination module for the peak shaving and valley filling mode, which is configured to determine the target dispatch power in the electric energy management system based on a difference between the current actual power of the photovoltaic module interface and a sum of the current actual power of the load module interface and the current grid flow setting power of the power grid module interface.

In some embodiments, the interface power information obtaining module 310 includes a data obtaining module for the energy storage priority mode, which is configured to obtain a current actual power of the photovoltaic module interface and a current actual power of the load module interface under the energy storage priority mode. The target dispatch power determination module 320 includes a target dispatch power determination module for the energy storage priority mode, which is configured to determine the target dispatch power in the electric energy management system based on a difference between the current actual power of the photovoltaic module interface and the current actual power of the load module interface.

In some embodiments, the electric energy regulation apparatus 300 further includes: a first photovoltaic module interface energy supply power limitation module, which is configured to limit, when an energy supply power of the photovoltaic module interface exceeds a sum of tolerable powers of the energy storage module interface, the load module interface, and the power grid module interface under the current operating mode of the electric energy management system, the energy supply power of the photovoltaic module interface to be less than or equal to the sum of the tolerable powers; a second photovoltaic module interface energy supply power limitation module, which is configured to limit, when the sum of the tolerable powers exceeds a maximum energy supply power of the photovoltaic module interface, the energy supply power of the photovoltaic module interface to be less than or equal to the maximum energy supply power.

In some embodiments, the first photovoltaic module interface energy supply power limitation module further includes a photovoltaic module interface energy supply power limitation module for the self-consumption mode, which is configured to limit, under the self-consumption mode, when the energy supply power of the photovoltaic module interface exceeds a sum of a maximum charging power of the energy storage module interface, a current actual power of the load module interface, and a maximum power released to the grid of the power grid module interface, the energy supply power of the photovoltaic module interface to be less than or equal to the sum of the maximum charging power of the energy storage module interface, the current actual power of the load module interface, and the maximum power released to the grid of the power grid module interface.

In some embodiments, the first photovoltaic module interface energy supply power limitation module further includes a photovoltaic module interface energy supply power limitation module for the peak shaving and valley filling mode, which is configured to limit, under the peak shaving and valley filling mode, when the energy supply power of the photovoltaic module interface exceeds a sum of a maximum charging power of the energy storage module interface, a current actual power of the load module interface, and a current grid flow setting power of the power grid module interface, the energy supply power of the photovoltaic module interface to be less than or equal to the sum of the maximum charging power of the energy storage module interface, the current actual power of the load module interface, and the current grid flow setting power of the power grid module interface.

In some embodiments, the first photovoltaic module interface energy supply power limitation module further includes a photovoltaic module interface energy supply power limitation module for the energy storage priority mode, which is configured to limit, under the energy storage priority mode, when the energy supply power of the photovoltaic module interface exceeds a sum of a maximum charging power of the energy storage module interface, a current actual power of the load module interface, and a maximum power released to the grid of the power grid module interface, the energy supply power of the photovoltaic module interface to be less than or equal to the sum of the maximum charging power of the energy storage module interface, the current actual power of the load module interface, and the maximum power released to the grid of the power grid module interface.

In some embodiments, the electric energy regulation apparatus 300 further includes: a power grid anti-backflow module configured to configure, under the self-consumption mode or the energy storage priority mode, when a power grid anti-backflow function of the electric energy management system is enabled, a maximum power released to the grid of the power grid module interface to 0.

In some embodiments, the electric energy regulation apparatus 300 further includes: an operation state determination module configured to determine an operation state of the electric energy management system based on the current operating mode of the electric energy management system and the target dispatch power.

Those skilled in the art can clearly understand that, for convenience and conciseness of the description, specific working processes of the above apparatus and modules can be referred to corresponding processes in the above method embodiments, and thus repeated description will be omitted here.

In the several embodiments provided in the present disclosure, the coupling between the modules may be in an electrical, mechanical, or other form.

In addition, individual functional modules in the embodiments of the present disclosure may be integrated in one processing module or may be separately physically present, or two or more modules may be integrated in one module. The integrated module as described above may be achieved in the form of hardware, or may be achieved in the form of a software functional module.

Figure 10:
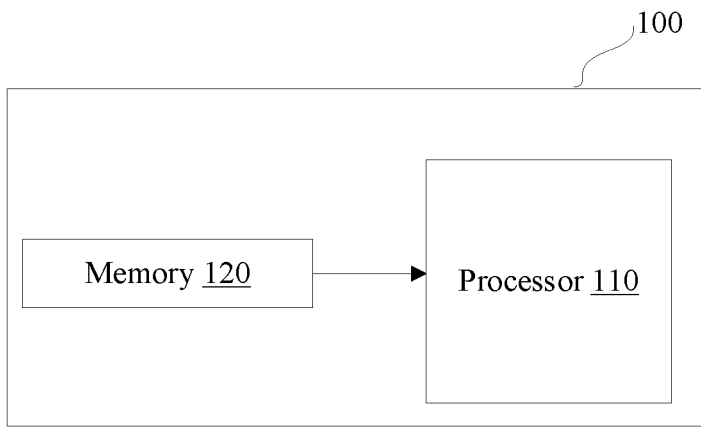
FIG. 10 is a block diagram showing a structure of an electronic device configured to execute an electric energy regulation method according to an embodiment of the present disclosure.

As illustrated in FIG. 10, FIG. 10 is a block diagram showing a structure of an electronic device according to an embodiment of the present disclosure. The electronic device 100 may be a switch, a computer, or a control unit with data transmission capabilities. The electronic device 100 in the present disclosure may include one or more of the following components: a processor 110, a memory 120, and one or more application programs stored in the memory 120 and configured to be executed by the one or more processors 110. The one or more programs are configured to implement the method according to the above method embodiments.

The processor 110 may include one or more processing cores. The processor 110 connects, via various interfaces and lines, various parts within the entire electronic device 100 to perform various functions of the electronic device 100 and process data by running or executing instructions, programs, code sets, or instruction sets stored in the memory 120, and by calling data stored in the memory 120. Optionally, the processor 110 may be implemented in at least one hardware form of a Digital Signal Processing (DSP), a Field-Programmable Gate Array (FPGA), or a Programmable Logic Array (PLA). The processor 110 may integrate one or a combination of a Central Processing Unit (CPU), a Graphics Processing Unit (GPU), or a modem. The CPU mainly handles the operating system, user interface, applications, etc. The GPU is responsible for rendering and drawing of contents to be displayed. The modem is configured to handle wireless communication. It should be understood that the above modem may be implemented by a single chip without being integrated into the processor 110.

The memory 120 may include a Random Access Memory (RAM) or a Read-Only Memory (ROM). The memory 120 may be configured to store instructions, programs, codes, code sets, or instruction sets. The memory 120 may include a program storage region and a data storage region. The program storage region can store instructions for implementing the operating system, instructions for implementing at least one function (such as touch function, sound playback function, image playback function), instructions for implementing the embodiments of the following methods, etc. The data storage region can also store the data (such as phonebooks, audio and video data, chat record data) created by the electronic device 100 during use.

Figure 11:
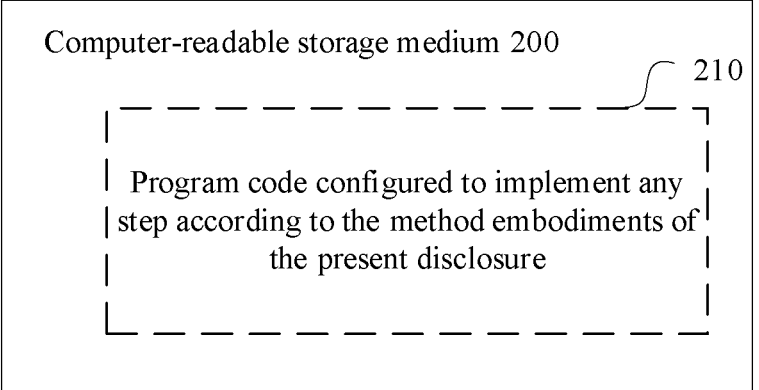
FIG. 11 illustrates a storage medium configured to store or carry a program code for implementing an electric energy regulation method according to an embodiment of the present disclosure.

As illustrated in to FIG. 11, FIG. 11 is a block diagram showing a structure of a computer-readable storage medium according to an embodiment of the present disclosure. The computer-readable storage medium 200 has a program code stored thereon. The program code is capable of being called by a processor to implement the method according to the above embodiments.

The computer-readable storage medium 200 may be an electronic memory such as a flash memory, an electrically-erasable programmable read-only memory (EEPROM), an EPROM, a hard disk, or a ROM. Optionally, the computer-readable storage medium 200 includes a non-transitory computer-readable storage medium. The computer-readable storage medium 200 has storage space for a program code 210 for implementing any method step in the above methods. These program codes may be read from or written to one or more computer program products. The program code 210 may be compressed, for example, in an appropriate form.

Finally, it should be noted that the above embodiments are only used to illustrate the technical solution of the present application and not to limit it. Although the present disclosure has been described in detail with reference to the aforementioned embodiments, those skilled in the art should understand that they can still modify the technical solutions recorded in the aforementioned embodiments or make equivalent substitutions for some of the technical features therein. However, these modifications or replacements do not drive the essence of the corresponding technical solutions to deviate from the spirit and scope of the technical solutions of each embodiment of the present disclosure.

What is claimed is:

1. An electric energy regulation method, applied in an electric energy management system configured to manage electric power among a photovoltaic module interface, an energy storage module interface, a load module interface, and a power grid module interface, the photovoltaic module interface being an interface through which a photovoltaic module is connected to the electric energy management system, the energy storage module interface being an interface through which an energy storage module is connected to the electric energy management system, the load module interface being an interface through which a load module is connected to the electric energy management system, the power grid module interface being an interface through which a power grid module is connected to the electric energy management system, the method comprising:

selectively obtaining interface power information corresponding to each of the photovoltaic module interface, the load module interface, and the power grid module interface based on a current operating mode of the electric energy management system, the interface power information comprising a magnitude of interface power and a flow direction of the interface power;

determining a target dispatch power in the electric energy management system based on the magnitude of the interface power and the flow direction of the interface power in the interface power information corresponding to each interface obtained selectively, the target dispatch power being a power that the electric energy management system requires the energy storage module interface to supply or absorb energy; and determining a to-be-supplemented electric power or a surplus electric power of the electric energy management system based on the target dispatch power, and invoking the energy storage module interface to supply energy based on the to-be-supplemented electric power or absorb energy based on the surplus electric power, wherein the method further comprises:

configuring, when an absolute value of the to-be-supplemented electric power exceeds an absolute value of a maximum discharging power of the energy storage module interface, an absolute value of an energy supply power of the energy storage module interface to be the absolute value of the maximum discharging power; and configuring, when an absolute value of the surplus electric power exceeds an absolute value of a maximum charging power of the energy storage module interface, an absolute value of an energy absorption power of the energy storage module interface to be the absolute value of the maximum charging power.

2. The method according to claim 1, further comprising:

configuring, when the energy storage module interface fails, a maximum charging power and a maximum discharging power of the energy storage module interface to 0;

configuring, when a State of Charge of the energy storage module interface exceeds a first predetermined value, the maximum charging power of the energy storage module interface to 0; and configuring, when the State of Charge of the energy storage module interface is lower than a second predetermined value, the maximum discharging power of the energy storage module interface to 0.

3. The method according to claim 1, wherein the operating mode comprises: a self-consumption mode, a peak shaving and valley filling mode, and an energy storage priority mode.

4. The method according to claim 3, wherein:

said selectively obtaining interface power information corresponding to each of the photovoltaic module interface, the load module interface, and the power grid module interface based on a current operating mode of the electric energy management system comprises:

obtaining a current actual power of each of the photovoltaic module interface and the load module interface under the self-consumption mode; and said determining a target dispatch power in the electric energy management system based on the magnitude of the interface power and the flow direction of the interface power in the interface power information corresponding to each interface obtained selectively comprises:

determining the target dispatch power in the electric energy management system based on a difference between the current actual power of the photovoltaic module interface and the current actual power of the load module interface.

5. The method according to claim 3, wherein:

said selectively obtaining interface power information corresponding to each of the photovoltaic module interface, the load module interface, and the power grid module interface based on a current operating mode of the electric energy management system comprises:

obtaining a current actual power of the photovoltaic module interface, a current actual power of the load module interface, and a current grid flow setting power of the power grid module interface under the peak shaving and valley filling mode; and said determining a target dispatch power in the electric energy management system based on the magnitude of the interface power and the flow direction of the interface power in the interface power information corresponding to each interface obtained selectively comprises:

determining the target dispatch power in the electric energy management system based on a difference between the current actual power of the photovoltaic module interface and a sum of the current actual power of the load module interface and the current grid flow setting power of the power grid module interface.

6. The method according to claim 3, wherein:

said selectively obtaining interface power information corresponding to each of the photovoltaic module interface, the load module interface, and the power grid module interface based on a current operating mode of the electric energy management system comprises:

obtaining a current actual power of the photovoltaic module interface and a current actual power of the load module interface under the energy storage priority mode; and said determining a target dispatch power in the electric energy management system based on the magnitude of the interface power and the flow direction of the interface power in the interface power information corresponding to each interface obtained selectively comprises:

determining the target dispatch power in the electric energy management system based on a difference between the current actual power of the photovoltaic module interface and the current actual power of the load module interface.

7. The method according to claim 3, further comprising:

limiting, when an energy supply power of the photovoltaic module interface exceeds a sum of tolerable powers of the energy storage module interface, the load module interface, and the power grid module interface under the current operating mode of the electric energy management system, the energy supply power of the photovoltaic module interface to be less than or equal to the sum of the tolerable powers; and limiting, when the sum of the tolerable powers exceeds a maximum energy supply power of the photovoltaic module interface, the energy supply power of the photovoltaic module interface to be less than or equal to the maximum energy supply power.

8. The method according to claim 7, wherein said limiting, when an energy supply power of the photovoltaic module interface exceeds a sum of tolerable powers of the energy storage module interface, the load module interface, and the power grid module interface under the current operating mode of the electric energy management system, the energy supply power of the photovoltaic module interface to be less than or equal to the sum of the tolerable powers comprises:

limiting, under the self-consumption mode, when the energy supply power of the photovoltaic module interface exceeds a sum of a maximum charging power of the energy storage module interface, a current actual power of the load module interface, and a maximum power released to the grid of the power grid module interface, the energy supply power of the photovoltaic module interface to be less than or equal to the sum of the maximum charging power of the energy storage module interface, the current actual power of the load module interface, and the maximum power released to the grid of the power grid module interface.

9. The method according to claim 7, wherein said limiting, when an energy supply power of the photovoltaic module interface exceeds a sum of tolerable powers of the energy storage module interface, the load module interface, and the power grid module interface under the current operating mode of the electric energy management system, the energy supply power of the photovoltaic module interface to be less than or equal to the sum of the tolerable powers comprises:

limiting, under the peak shaving and valley filling mode, when the energy supply power of the photovoltaic module interface exceeds a sum of a maximum charging power of the energy storage module interface, a current actual power of the load module interface, and a current grid flow setting power of the power grid module interface, the energy supply power of the photovoltaic module interface to be less than or equal to the sum of the maximum charging power of the energy storage module interface, the current actual power of the load module interface, and the current grid flow setting power of the power grid module interface.

10. The method according to claim 7, wherein said limiting, when an energy supply power of the photovoltaic module interface exceeds a sum of tolerable powers of the energy storage module interface, the load module interface, and the power grid module interface under the current operating mode of the electric energy management system, the energy supply power of the photovoltaic module interface to be less than or equal to the sum of the tolerable powers comprises:

limiting, under the energy storage priority mode, when the energy supply power of the photovoltaic module interface exceeds a sum of a maximum charging power of the energy storage module interface, a current actual power of the load module interface, and a maximum power released to the grid of the power grid module interface, the energy supply power of the photovoltaic module interface to be less than or equal to the sum of the maximum charging power of the energy storage module interface, the current actual power of the load module interface, and the maximum power released to the grid of the power grid module interface.

11. The method according to claim 3, further comprising:

configuring, under the self-consumption mode or the energy storage priority mode, when a power grid anti-backflow function of the electric energy management system is enabled, a maximum power released to the grid of the power grid module interface to 0.

12. The method according to claim 3, further comprising:

determining an operation state of the electric energy management system based on the current operating mode of the electric energy management system and the target dispatch power.

13. An electronic device, comprising:

one or more processors;

a memory; and one or more application programs stored in the memory and configured to be executed by the one or more processors, the one or more programs being configured to implement an electric energy regulation method, the electric energy regulation method being applied in an electric energy management system configured to manage electric power among a photovoltaic module interface, an energy storage module interface, a load module interface, and a power grid module interface, the photovoltaic module interface being an interface through which a photovoltaic module is connected to the electric energy management system, the energy storage module interface being an interface through which an energy storage module is connected to the electric energy management system, the load module interface being an interface through which a load module is connected to the electric energy management system, the power grid module interface being an interface through which a power grid module is connected to the electric energy management system, the method comprising:

selectively obtaining interface power information corresponding to each of the photovoltaic module interface, the load module interface, and the power grid module interface based on a current operating mode of the electric energy management system, the interface power information comprising a magnitude of interface power and a flow direction of the interface power;

determining a target dispatch power in the electric energy management system based on the magnitude of the interface power and the flow direction of the interface power in the interface power information corresponding to each interface obtained selectively, the target dispatch power being a power that the electric energy management system requires the energy storage module interface to supply or absorb energy; and determining a to-be-supplemented electric power or a surplus electric power of the electric energy management system based on the target dispatch power, and invoking the energy storage module interface to supply energy based on the to-be-supplemented electric power or absorb energy based on the surplus electric power, wherein the method implemented by the one or more programs further comprises:

configuring, when an absolute value of the to-be-supplemented electric power exceeds an absolute value of a maximum discharging power of the energy storage module interface, an absolute value of an energy supply power of the energy storage module interface to be the absolute value of the maximum discharging power; and configuring, when an absolute value of the surplus electric power exceeds an absolute value of a maximum charging power of the energy storage module interface, an absolute value of an energy absorption power of the energy storage module interface to be the absolute value of the maximum charging power.

14. The electronic device according to claim 13, wherein the method implemented by the one or more programs further comprises:

configuring, when the energy storage module interface fails, a maximum charging power and a maximum discharging power of the energy storage module interface to 0;

configuring, when a State of Charge of the energy storage module interface exceeds a first predetermined value, the maximum charging power of the energy storage module interface to 0; and configuring, when the State of Charge of the energy storage module interface is lower than a second predetermined value, the maximum discharging power of the energy storage module interface to 0.

15. The electronic device according to claim 13, wherein the operating mode comprises: a self-consumption mode, a peak shaving and valley filling mode, and an energy storage priority mode.

16. The electronic device according to claim 15, wherein:

said selectively obtaining interface power information corresponding to each of the photovoltaic module interface, the load module interface, and the power grid module interface based on a current operating mode of the electric energy management system comprises:

obtaining a current actual power of each of the photovoltaic module interface and the load module interface under the self-consumption mode; and said determining a target dispatch power in the electric energy management system based on the magnitude of the interface power and the flow direction of the interface power in the interface power information corresponding to each interface obtained selectively comprises:

determining the target dispatch power in the electric energy management system based on a difference between the current actual power of the photovoltaic module interface and the current actual power of the load module interface.

17. The electronic device according to claim 15, wherein:

said selectively obtaining interface power information corresponding to each of the photovoltaic module interface, the load module interface, and the power grid module interface based on a current operating mode of the electric energy management system comprises:

obtaining a current actual power of the photovoltaic module interface, a current actual power of the load module interface, and a current grid flow setting power of the power grid module interface under the peak shaving and valley filling mode; and said determining a target dispatch power in the electric energy management system based on the magnitude of the interface power and the flow direction of the interface power in the interface power information corresponding to each interface obtained selectively comprises:

determining the target dispatch power in the electric energy management system based on a difference between the current actual power of the photovoltaic module interface and a sum of the current actual power of the load module interface and the current grid flow setting power of the power grid module interface.

18. A non-transitory computer-readable storage medium, having a program code stored thereon, wherein the program code is capable of being called by a processor to implement an electric energy regulation method, the electric energy regulation method being applied in an electric energy management system configured to manage electric power among a photovoltaic module interface, an energy storage module interface, a load module interface, and a power grid module interface, the photovoltaic module interface being an interface through which a photovoltaic module is connected to the electric energy management system, the energy storage module interface being an interface through which an energy storage module is connected to the electric energy management system, the load module interface being an interface through which a load module is connected to the electric energy management system, the power grid module interface being an interface through which a power grid module is connected to the electric energy management system, the method comprising:

selectively obtaining interface power information corresponding to each of the photovoltaic module interface, the load module interface, and the power grid module interface based on a current operating mode of the electric energy management system, the interface power information comprising a magnitude of interface power and a flow direction of the interface power;

determining a target dispatch power in the electric energy management system based on the magnitude of the interface power and the flow direction of the interface power in the interface power information corresponding to each interface obtained selectively, the target dispatch power being a power that the electric energy management system requires the energy storage module interface to supply or absorb energy; and determining a to-be-supplemented electric power or a surplus electric power of the electric energy management system based on the target dispatch power, and invoking the energy storage module interface to supply energy based on the to-be-supplemented electric power or absorb energy based on the surplus electric power, wherein the method further comprises:

configuring, when an absolute value of the to-be-supplemented electric power exceeds an absolute value of a maximum discharging power of the energy storage module interface, an absolute value of an energy supply power of the energy storage module interface to be the absolute value of the maximum discharging power; and configuring, when an absolute value of the surplus electric power exceeds an absolute value of a maximum charging power of the energy storage module interface, an absolute value of an energy absorption power of the energy storage module interface to be the absolute value of the maximum charging power.

\* \* \* \* \*